United States Patent [19]

Sakamaki

[11] 3,827,701

[45] Aug. 6, 1974

[54] OIL SEAL FOR USE IN ROTARY PISTON INTERNAL COMBUSTION ENGINE

[75] Inventor: Hiroshi Sakamaki, Utsunomiya, Japan

[73] Assignee: Nippon Piston Ring Co., Ltd., Tokyo, Japan

[22] Filed: Apr. 7, 1972

[21] Appl. No.: 241,937

[30] Foreign Application Priority Data
Apr. 8, 1971    Japan................................ 46-25834

[52] U.S. Cl................................ 277/81 P, 418/142
[51] Int. Cl. ............................................ F01c 19/00
[58] Field of Search ............ 277/81 R, 81 P, 95, 96; 418/61, 144, 142

[56] References Cited
UNITED STATES PATENTS
3,176,910   4/1965   Bentele................................ 277/81

| | | |
|---|---|---|
| 3,321,128 | 5/1967 | Fezer et al........................... 418/144 |
| 3,575,541 | 4/1971 | Hamada.............................. 418/142 |
| 3,697,202 | 10/1972 | Reinhart.............................. 418/142 |

FOREIGN PATENTS OR APPLICATIONS
1,241,662   6/1967   Germany........................... 277/81 P Primary Examiner—Louis R. Prince
Assistant Examiner—Robert I. Smith
Attorney, Agent, or Firm—Sughrue, Rothwell, Mion, Zinn & Macpeak

[57] ABSTRACT

An oil seal for use in a rotary piston internal combustion engine which has at least one annular groove provided on an annular sliding face formed with an axial outer surface of the oil seal and adjacent to and facing an inside wall face of a side housing of the engine.

2 Claims, 8 Drawing Figures

PATENTED AUG 6 1974　　　3,827,701

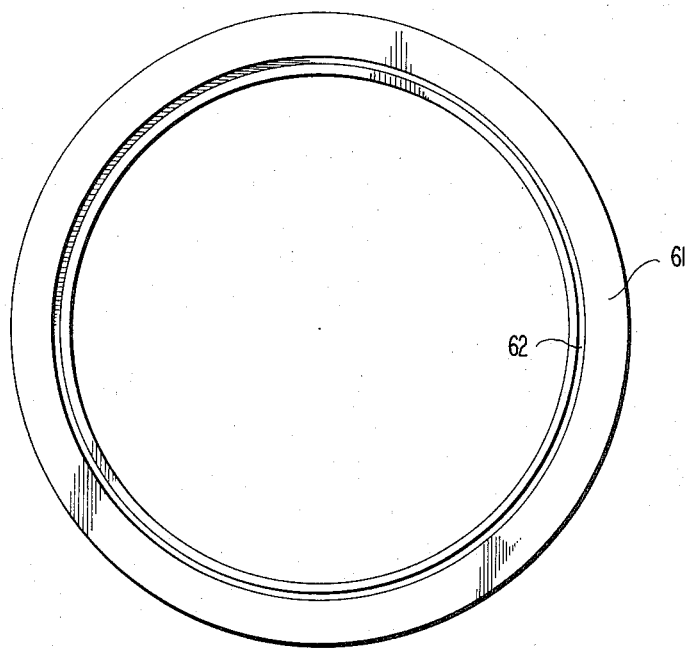
FIG. 4
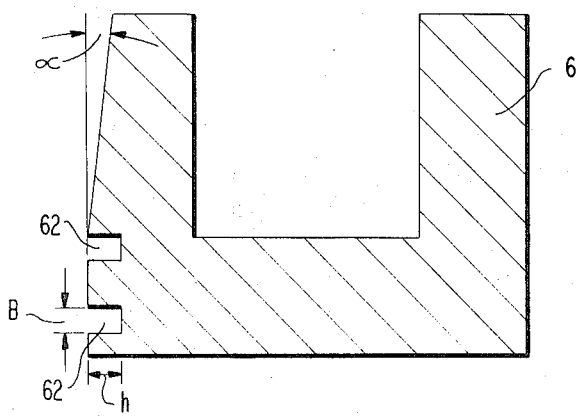
FIG. 5
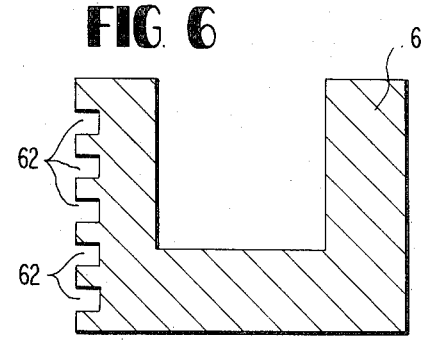
FIG. 6
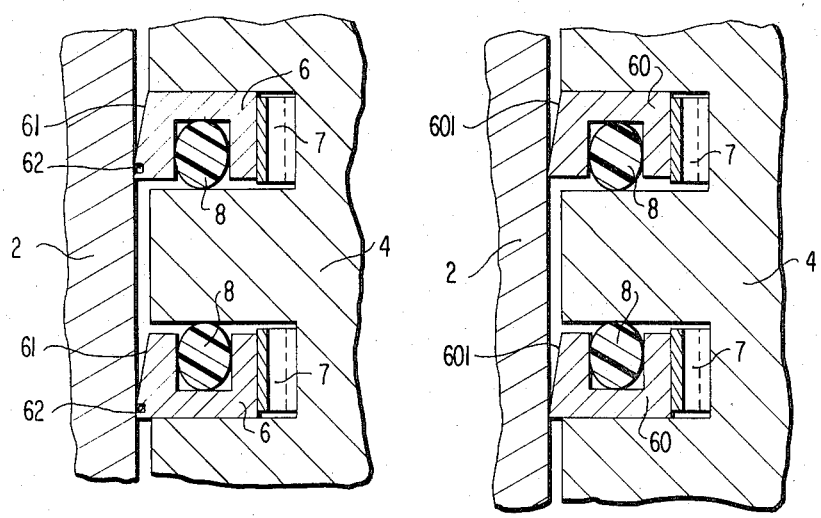
FIG. 7A
FIG. 7B PRIOR ART

OIL SEAL FOR USE IN ROTARY PISTON INTERNAL COMBUSTION ENGINE

BACKGROUND OF THE INVENTION

1. Field of the Invention

This invention relates to improvements of an oil seal for use in a rotary piston internal combustion engine, and more particularly relates to improvements of such an oil seal which is axially and slidably disposed in an annular groove provided on a thrust face of a rotor of the engine and which maintains durable and efficient oil-tightness between a side housing and a rotor of the engine.

2. Description of the Prior Art

In general, for the purpose of lubricating and cooling the rotary piston internal combustion engine, the lubricating oil is caused to flow through or along elements constructing the engine by various means such as a pump, and, since this oil is caused to flow between the rotor side face and an adjacent inside wall face of the engine, it is necessary to provide efficient oil sealing to prevent the leakage of the oil into the combustion chamber, in order to minimize the burning of the oil in order to prevent the generation and accumulation of carbon slag during operation of the engine. In view of these problems and in order to provide an engine with better durability and higher output, the sealing between the rotor side face and the adjacent inside wall face of the side housing is one of the important considerations in the engine. Therefore, the sealing action of the oil seal which sealingly engages the adjacent inside wall face is one of the important factors of the sealing function. In addition to this, another function required for the oil seal is a scraping or wiping of the oil on the inside wall face of the side housing in order to prevent the leakage of the oil into the combustion chamber.

Hitherto, for these purposes, there has been recommended an oil seal having an axial outer sliding face at a lip angle α with respect to the inside wall face of the side housing, so that an axial outer and radial inner peripheral portion of the oil seal points towards the wall of the side housing and sealingly engages the inside wall face. The oil seal moves with the planetary motion of the rotor in frictional contact with the inside wall face of the side housing at the axial outer and radial inner peripheral portion, and effective and sharp oil scraping and tight sealing has been achieved to some extent, as shown in FIG. 7B. However, the defect of the seals of the type is that the development of the wear at the said peripheral portion of the oil seal causes a relatively rapid enlargement of the frictional contact face of the oil seal and a reduced frictional contact with the adjacent inside wall face which considerably reduces the sealing effect therebetween.

SUMMARY OF THE INVENTION

The present invention, therefore, contemplates to eliminate the aforesaid disadvantages of the conventional oil seal and to provide an improved oil seal which provides a further improved sealing function.

An object of the present invention is to provide an oil seal for effectively sealing the rotary piston internal combustion engine against leakage, especially oil leakage into the combustion chamber.

Another object of the present invention is to provide an oil seal having at least one annular groove provided on the annular sliding face whereby durable and efficient oil-tightness between the side housing and the rotor is further improved.

BRIEF DESCRIPTION OF THE DRAWINGS

Further objects, features and advantages of the present invention will become apparent from the following description taken in connection with the accompanying drawings, in which:

FIG. 4 is a front view of the oil seal according to the present invention.

FIG. 5 is an enlarged sectional view of another embodiment of the oil seal according to the present invention.

FIG. 6 is an enlarged sectional view of a further embodiment of the oil seal according to the present invention.

FIG. 7A is an enlarged longitudinal sectional view of a part of the engine which adapts oil seals according to the present invention to the engine.

FIG. 7B is an enlarged longitudinal sectional view of a part of the engine which adapts conventional oil seals.

DETAILED DESCRIPTION OF THE INVENTION

Figure 1:
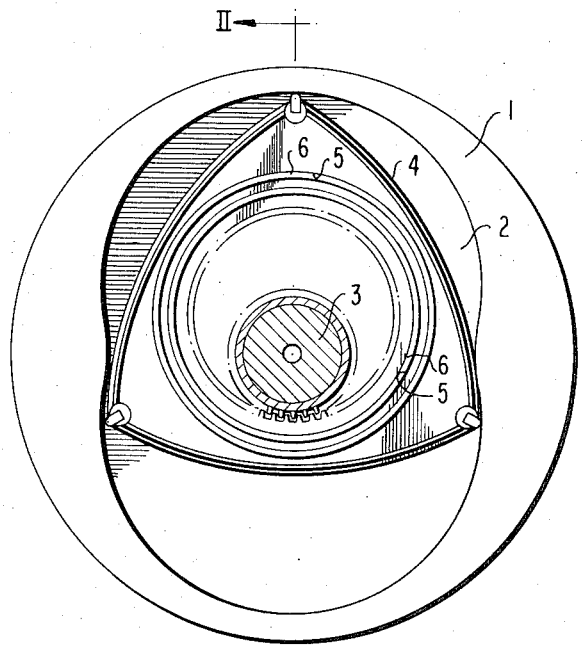
FIG. 1 is a diagrammatic cross-sectional elevation view of a rotary piston internal combustion engine provided with an oil seal according to the present invention.
Figure 2:
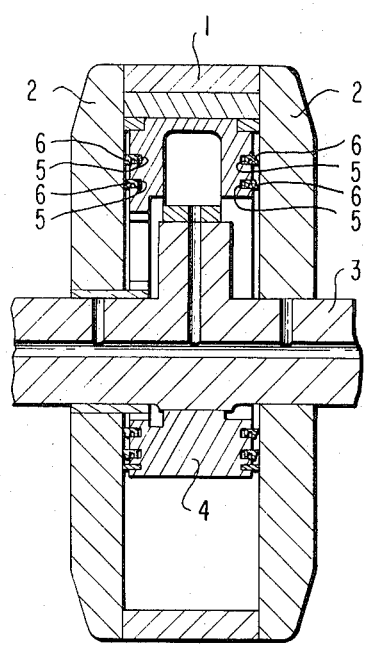
FIG. 2 is a longitudinal sectional view of the engine taken along the line II—II in FIG. 1.
Figure 3:
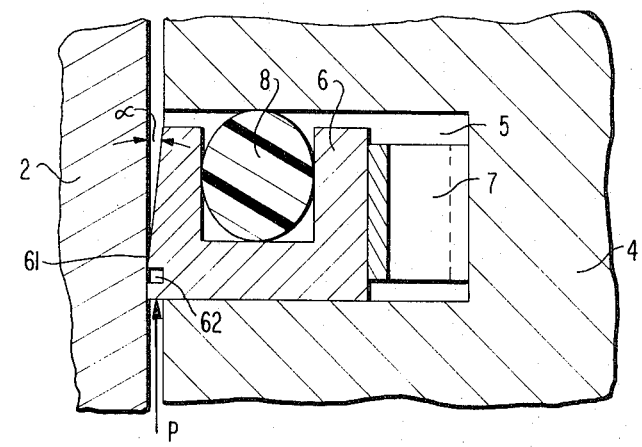
FIG. 3 is an enlarged sectional view of a part of the engine of FIG. 2 and shows a sectional view of one embodiment of the oil seal according to the present invention.

Referring now to FIGS. 1 to 3, which show one embodiment of the present invention, reference numeral 1 illustrates the center housing of the rotary piston internal combustion engine, 2 is a side housing, 3 is an eccentric shaft bridged between the side housings 2, 2, 4 is a rotor supported by the eccentric shaft 3 in such a manner that the rotor 4 is eccentrically rotated while sliding relative to the inside wall faces of the center housing and the side housing. An annular oil seal groove 5 is recessed within the thrust face of the rotor 4. An oil seal 6 is mounted in the oil seal groove 5. The oil seal 6 includes an O-ring 8 and a spring 7 provided at the axial inner face of the oil seal 6 to urge the oil seal 6 onto the adjacent inside wall face 21 of the side housing.

In FIG. 4, the oil seal 6 of the present invention has an annular groove 62 provided on an annular sliding face 61.

By using the above described oil seal according to the present invention in the rotary piston internal combustion engine, the oil pressure represented by arrow P leaking the oil outward of the oil seal 6 is decreased under the action of the annular groove 62, so that the leakage of the oil is remarkably prevented, and moreover since the oil always exists in the groove 63, the lip face 61a is remarkably protected from frictional wear itself. Thus, the oil tightness is sufficiently maintained so as to prevent an increase in lubricating oil consumption and accumulation of carbon slag.

Though the sectional forms of the annular groove 63 may be any of rectangular, semi-circuit, triangular, shape etc., the rectangular shape is most preferable. The width B of the groove is preferably 0.1 mm to 0.55 mm, and the depth h is approximately 3 times the width B to produce a labyrinth oil sealing effect.

In the present invention, the oil seal may be provided with two annular grooves within the sliding face as shown in FIG. 5, and moreover, there may be provided five annular grooves as shown in FIG. 6. Further, it is most preferable relative to the function of the oil seal to form the sliding face with a lip face having a lip angle α. In such oil seals, the sliding face has one or two annular grooves thereon, as shown in FIGS. 4 and 6, and the oil seal is given an additional function of oil take-in action there by.

In order to attest to the supriority of the present oil seal, the inventor of the present invention made the following experiments.

EXPERIMENT 1

In Test A, an oil seal tester which is constructed with the oil seal 6 of the present invention equipped with the spring 7 and O-ring 8 as shown in FIG. 7A was operated for two hours.

In Test B, the oil seal tester which is constructed with the conventional oil seal 60 equipped with the spring 7 and O-ring 8 as shown in FIG. 7B was operated for two hours also.

The comparison of lubricating oil consumption in Test A and Test B is shown in the following Table 1.

The conditions for operating both oil seal testers were as follows:

| | |
|---|---|
| The number of revolutions: | 5,000 (r.p.m.) |
| Oil pressure: | 2 (Kg/cm$^2$) |
| The temperature of the oil: | 80° ± 1 (°C) |

Table 1

| | Lubricating Oil Consumption (g) |
|---|---|
| Test A | 234 |
| Test B | 533 |

As shown in Table 1, by using the oil seal of the present invention, lubricating oil consumption may be reduced to half of that of using the conventional oil seal.

Thus, it will be understood that providing of annular groove on the sliding face is remarkably effective for reducing lubricating oil consumption.

EXPERIMENT 2

The following Table 2 shows respective test results with respect to the rate of enlargement of the frictional contacting face on the sliding face when the same oil seal testers as used in Test A and Test B in the foregoing Experiment 1 were respectively operated for 18 hours under the same conditions as those in Experiment 1.

Test C is in the case of using the oil seal of the present invention, and Test D is in the case of using the conventional oil seal.

Table 2

| The Rate of Enlargement of Frictional Contacting Face (%) | |
|---|---|
| Test C | 0.5 |
| Test D | 2.3 |

The oil seal according to the present invention may prevent the enlargement of the frictional contacting face thereof.

It should be understood from the foregoing description that since the oil seal of the present invention is thus constructed with simple structure, it may be used for maintaining proper oil seal action for a long time.

What is claimed is:

1. An oil seal for use in a rotary piston internal combustion engine, wherein said seal has an annular sliding face on an axial outer side thereof in contact with a side wall housing, the improvement wherein said sliding face comprises at least two regularly spaced, non-communicating annular grooves therein facing said side wall, and wherein each of said grooves is rectangular in cross section and each has a depth approximating three times its width.

2. The oil seal as set forth in claim 1, wherein the width of said groove is 0.1 mm to 0.5 mm and the depth of said groove is 0.2 mm to 1.2 mm.

* * * * *